Sept. 5, 1950            J. J. DIMMENDAAL            2,521,351
SECTIONAL BLOCK CONDUIT
Filed July 9, 1947
Fig. 1
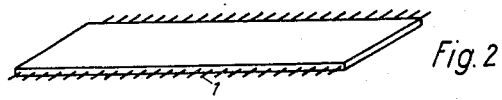
Fig. 2
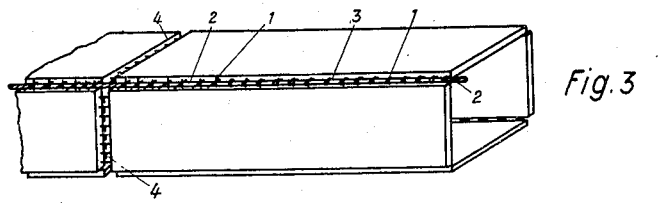
Fig. 3
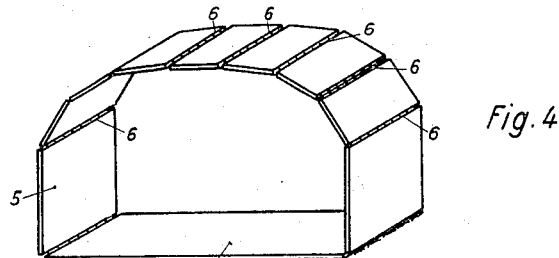
Fig. 4
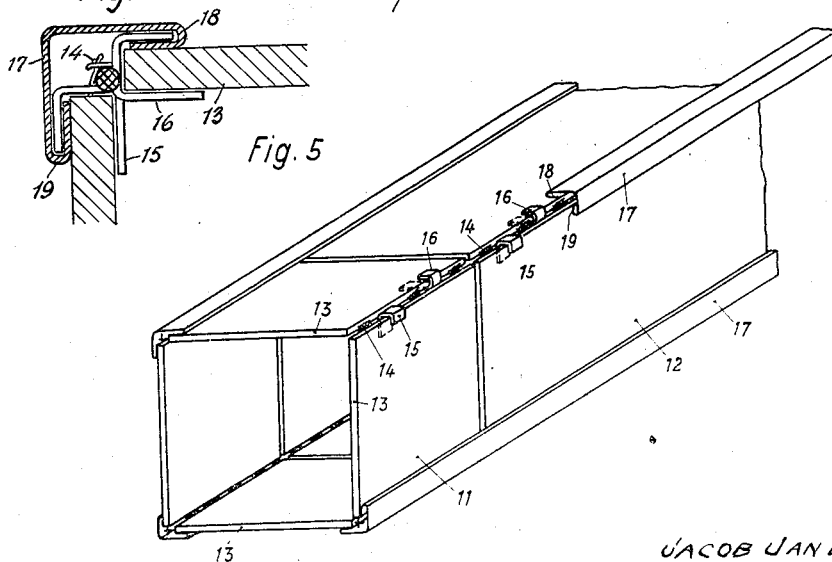
Fig. 6
Fig. 5
INVENTOR
JACOB JAN DIMMENDAAL
BY
*Robert E Burns*
ATTORNEY.

Patented Sept. 5, 1950

2,521,351

UNITED STATES PATENT OFFICE 2,521,351

SECTIONAL BLOCK CONDUIT

Jacob Jan Dimmendaal, Ellecom, Netherlands

Application July 9, 1947, Serial No. 759,830
In the Netherlands March 10, 1943

Section 1, Public Law 690, August 8, 1946
Patent expires March 10, 1963

3 Claims. (Cl. 138—81)

The invention relates to a process for joining at their edges a pair of slab shaped parts consisting of wire armoured fibrous cement, such as asbestos cement.

It is an object of the invention to provide for a novel method for manufacturing hollow bodies, such as conduit elements adapted to be used in chimneys and in heating and ventilating channels. Up to the present such conduit elements have been manufactured by placing around a mold a slab of a desired width in the fresh, plastic condition, closing the longitudinal seam thus obtained by ramming or knocking and removing the mold after the material has sufficiently hardened, after which the conduit element must still be cured during a considerable space of time (about six weeks) before it is ready for use.

The seam of such conduit elements shows the disadvantage that the armouring is interrupted at that place so that the seam constitutes a weak spot in the conduit element. A further disadvantage of the above known process lies in that it is rather time consuming, so that delivery takes a long time. This drawback may be met by keeping a store of conduit elements of the usual sizes, but this measure does not provide a solution for such frequent cases when conduit elements of unusual size and shape are required.

It is an object of the invention to provide for a method of manufacture of conduit elements and similar hollow bodies, whereby weak spots at the seams are avoided. A further object is to enable a rapid delivery to be made of conduit elements and the like in any desired size and shape. Further objects are to diminish the costs of manufacture and transportation of conduit elements and similar hollow bodies.

Another object of the invention is to provide for a simple and inexpensive method for joining a pair of slabs of wire armoured fibrous cement. Still another object is to obtain a special protection for the edges of a conduit element, whereby the element is made more resistant against flexure and the number of supports of a conduit may be diminished. A further object is to provide for a conduit element which can be placed close to a wall of a building.

According to the invention a joint between two slab shaped parts consisting of wire armoured fibrous cement is made by laying open the armouring by removal of the fibrous cement at the edges to be joined, connecting together the armouring wires projecting from one of the said parts each with an armouring wire projecting from the other part, e. g. by welding or twisting, filling up the gap remaining between the said parts with mortar, and finishing off the seam obtained in this manner between the said parts. The removal of the fibrous cement at the edges may be effected by pulverization. When the parts to be joined enclose an angle between them it is preferable to provide a packing material, for instance a bitumen or similar packing cord in the gap between the parts before connecting together the armouring wires. This packing material is firmly pressed against the edges of the parts to be joined by the twisted or welded wires, so that a very tight joint is obtained.

In a preferred embodiment of the invention conduit elements or similar hollow bodies are manufactured out of a plurality of prefabricated slabs of wire armoured fibrous cement by sawing the slabs to the desired dimensions and joining them in the above described manner. Conduit elements and the like may thus be manufactured in a very short time from slabs in store, so that the time of delivery is considerably shortened. Moreover, the wooden mold is no longer necessary, which means a welcome cut in cost price.

In another embodiment of the invention conduit elements and the like are manufactured out of one prefabricated slab of wire armoured fibrous cement by laying open the armouring by removal of the fibrous cement at least at two opposite edges of the slab and along a plurality of lines running across the slab, bending the slab so as to place the said edges alongside each other, joining the edges by means of the above described method and filling up the gaps remaining at the said lines with mortar. For tightening the seams use may be made of a packing cord or the like as mentioned above.

In the manufacture of conduit elements and the like the invention offers an opportunity for economizing on transportation expenses by making the required conduit elements in situ, so that the slabs may be transported to the building site as flat lying material. The slabs may be sawn to the desired dimensions at the works. Another advantage is, that the finishing off of the conduit elements may be effected on the building site.

Modifications of pipe system consisting of conduit elements according to the invention may be readily made without any difficulty.

In practising the invention a special protection of the edges of the conduit elements is preferably obtained by fitting a plurality of U-shaped guiding members around the edges of each of the slabs constituting the conduit element in such a manner, that the external legs of these guiding members are spaced with respect to the surfaces of the slabs and by providing for a plurality of corner fillets each enclosing one of the edges and provided with channel shaped edges which slide over the said guiding members. In this manner an efficient protection of the vulnerable edges of the conduit element is obtained. At the same time a neat appearance of the conduit element is obtained and the strength thereof is considerably increased. More particularly corner fillets of the described construction may be used at the joints between two conduit elements instead of the usual sleeve joints. Thus the number of supports may be considerably decreased, as in contradistinction to sleeve joints, not every corner fillet demands a support. Corner fillets may also be provided over the full length of the conduit element, in which case the corner fillets are preferably carried out so as to telescope at their ends.

As the dimensions of the joints do not exceed those of other portions of the conduit element, the element may in contradistinction to the conduits now in use be placed close to a wall.

The invention will be more readily understood by reference to the accompanying drawing, in which Fig. 1 represents a prefabricated slab of wire armoured fibrous cement.

Fig. 2 represents the same slab after sawing to the required dimensions and removing the fibrous cement at the edges.

Fig. 3 shows a conduit element according to the invention and part of an adjoining conduit element.

Fig. 4 shows another conduit element according to the invention.

Fig. 5 shows an embodiment of the invention, in which a special protection for the edges has been provided, and Fig. 6 shows a detail of the construction of Fig. 5.

In Fig. 1 a slab of wire armoured fibrous cement, e. g. asbestos cement of standard length and width is shown. In order to make a conduit element, four of such slabs are sawn off along the line a—a so that their width corresponds to that of the required conduit element. Each of the slabs is then stripped of its fibrous cover along two opposite edges, so that the armouring wires project as shown at 1 in Fig. 2. The four slabs are then placed in such a position, that each slab is perpendicular to the two adjacent ones, as shown in Fig. 3. A bitumen cord 2 is placed into each of the gaps remaining between the slabs. After that the slabs are interconnected by twisting the projecting armouring wires as shown at 3, the ends of the armouring wires are bent over and pressed into the gap and the gaps are filled up with fibrous mortar. Finally the four seams or joints obtained at the edges of the conduit element are finished off. A joint between two conduit elements may be made in the same manner as indicated at 4 in Fig. 3. For this purpose the fibrous cement is likewise removed by pulverization or the like at the edges to be joined, the projecting armouring wires are interconnected by twisting, and the ends of the wires are pressed into the seams, after which the remaining gaps are filled up with mortar and finished off.

Fig. 4 shows a conduit element with a dome shaped section. In order to manufacture this conduit element a slab 5 is provided with a plurality of grooves 6 on both sides of the armouring and bent along these grooves. At two opposite edges of the slab the fibrous material is removed so as to lay open the armouring, after which the uncovered armouring wires are twisted together with the uncovered armouring wires of a bottom slab 7. Of course it is also possible to connect both ends of such a grooved slab together, so that a conduit element is manufactured out of a single slab. After that, the remaining gaps are filled up with mortar and finished off.

Fig. 5 represents a perspective view of two portions of a conduit provided with special corner fillets for protection of the edges. One of the corner fillets has not yet obtained its final position. Two conduit elements 11 and 12 are manufactured out of asbestos cement slabs in the above described manner, the slabs 13 being connected together by twisting the projecting armouring wires 14. The elements 11 and 12 are interconnected in the same way. U-shaped iron guiding members 15 and 16 are fitted at some distance from each other around the slabs 13. The twisted armouring wires 14 prevent the guiding members from moving along the edge. A corner fillet 17, with channel shaped inwardly bent edges 18 and 19, as shown in Fig. 6, is slid over the guiding members in such a manner, that the edge 18 fits around the external legs of the guiding members 16, and the edge 19 fits around the external legs of the guiding members 15. By shoving along the corner fillet 17 along the edge of the conduit elements, the elements 11 and 12 are firmly connected together.

In order to facilitate the positioning of the corner fillets, the channel shaped edges thereof may be provided with recesses each adapted to pass sideways over one of the guiding elements. Thus the corner fillet can be placed around an edge of the conduit element by passing these recesses each over one of the guiding elements, and then sliding the corner fillet along the edge over some distance.

Modifications, such as branchings of a pipe line consisting of conduit elements as are shown in Figs. 5 and 6, are readily made by pushing away the corner fillets and laying open the armouring at the easily accessible edges of the conduit element. The twisted armouring wires may then be cut, the fibrous cement be pulverized so as to remove a part of a slab, and new slabs be added by twisting together the armouring wires of the old and the new slabs, filling up the remaining gaps with mortar and finishing off.

I claim:

1. A conduit element, comprising a plurality of slab shaped parts consisting of wire armoured fibrous cement, a plurality of armouring wires embedded in each of the said parts and projecting therefrom at least at two opposite edges, means for interconnecting said slabs at the edges thereof comprising the said projecting armouring wires connected together each with armouring wires projecting from adjacent edges, a plurality of U-shaped guiding members fitted around each of the said edges, the external legs of the said members being spaced in relation to the outer surfaces of the said parts, a filling of mortar in each of the gaps between adjacent ones of the said parts, and a plurality of corner fillets each enclosing a joint between two adjacent ones of the said parts, the said corner fillets being provided with channel shaped edges adapted to be slid over the said guiding members.

2. A conduit element as claimed in claim 1, wherein the said channel shaped edges of at least one of the said corner fillets are provided with a plurality of recesses each adapted to pass sideways over one of the said guiding members, whereby the corner fillet can be placed around the said joint by passing the said recesses each over one of the said guiding members and then sliding the corner fillet along the said joint for some distance.

3. In combination, two conduit elements as claimed in claim 1, placed in coaxial alignment behind each other, wherein at least one of the said corner fillets of one of the said conduit elements is adapted to telescope over the corresponding corner fillet of the other one of the said conduit elements.

JACOB JAN DIMMENDAAL.

REFERENCES CITED

The following references are of record in the file of this patent:

UNITED STATES PATENTS

| Number | Name | Date |
|---|---|---|
| 1,278,111 | Cummings | Sept. 11, 1918 |
| 2,004,936 | Dorn et al. | June 18, 1935 |

OTHER REFERENCES

"Concrete Plain & Reinforced," by Taylor and Thompson, published by John Wiley & Sons, New York, 1909. (Copy in Division 15.)